April 21, 1953
R. M. ROBERTS
2,635,466
GAUGE FOR MEASURING CAVITIES
Filed March 27, 1951
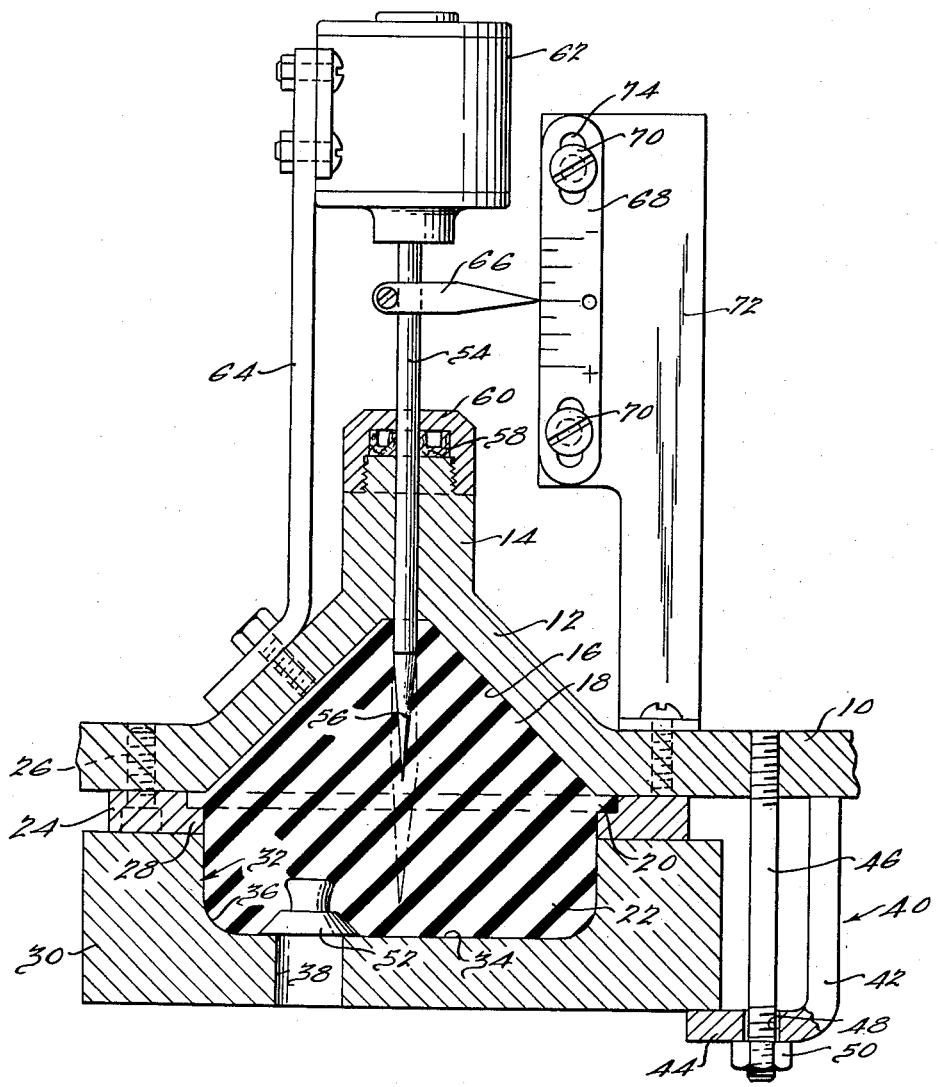
INVENTOR.
Russell M. Roberts,
BY
Harness, Dickey & Pierce
ATTORNEYS.

Patented Apr. 21, 1953

2,635,466

UNITED STATES PATENT OFFICE 2,635,466

GAUGE FOR MEASURING CAVITIES

Russell M. Roberts, Farmington, Mich.,

Application March 27, 1951, Serial No. 217,760

5 Claims. (Cl. 73—149)

This invention relates to new and useful improvements in gauges for measuring the volume of cavities.

There are many situations where it is necessary to measure the volume of a cavity and to compare the same with a predetermined standard. A typical situation appears in the automotive industry where it is necessary to measure the volume of cavities in engine cylinder heads. It is necessary to know accurately in any particular instance whether the cavity is oversize or undersize and the exact amount that the particular cavity deviates from a master cavity of predetermined volume. In practice, the cylinder heads travel on a conveyer at a predetermined rate of speed and the gauge must be able to check the heads as they move along. In one typical installation it is necessary to gauge or check 534 cylinder heads an hour. In order to perform its intended function satisfactorily, the gauge must be easy to operate, it must be susceptible of easy insertion into and removal from the cavity to be checked, it must operate repeatedly without appreciable or significant variation in measurement, and the gauge, as well as its operating parts, must be strong and rugged to obviate possibility of the device breaking down in use and interrupting the production schedule.

An important object of the present invention is to provide a gauge for checking cavities that is pre-eminently satisfactory in every respect set forth above.

Other objects and advantages of the invention will be apparent during the course of the following description.

In the drawing forming a part of this specification and wherein like numerals are employed to designate like parts throughout the same, The single figure shown is a view partly in section and partly in elevation of a gauge embodying the invention and showing the same in operative association with a part having a cavity to be measured.

In the drawing, wherein for the purpose of illustration is shown a preferred embodiment of the invention, the numeral 10 designates a stationary, horizontal, supporting plate which carries the several operating parts of the gauge. The plate 10 is formed with an upstanding, conical portion 12 terminating in an upwardly extending embossment 14. The underside of the conical extension 12 has a corresponding cone-shaped cavity 16 which receives a body 18 of elastomeric material such as rubber or the like. As clearly shown in the drawing, the upper portion of body 18 conforms exactly to the cavity 16 and, if desired, it may be vulcanized or otherwise suitably bonded to the wall of the cavity 16. Immediately below cavity 16 the body 18 is formed with a radially outwardly extending annular flange 20 which seats upwardly against the bottom of the plate 10. Below the flange 20 the body 18 is formed with a portion 22 which depends from the plate 10 and is shaped to conform at least generally to but preferably is slightly smaller than the cavity to be checked. A retaining plate 24 surrounding depending portion of the body 18 and fastened to plate 10 by screws 26 has an inwardly extending lip 28 which overlies the flange 20 and assists in holding the body attached to the plate 10.

It will readily be appreciated that the depending portion 22 of the body 18 can be substantially any size or shape, and in any particular instance, the form of the depending portion will vary depending upon the form of the cavity to be checked. In the drawing, a block 30 is shown by way of illustration and the block has a cavity 32 in the top surface thereof. The cavity 32 is generally circular in outline, it is essentially shallow having a flat bottom 34, and the bottom is joined to the side walls of the cavity by a rounded fillet or radius 36. A hole 38 is provided in the block at the bottom of the cavity 32.

Some means preferably is provided for holding the block 30 attached solidly to the plate 10, and in the drawing this means is in the form of a clamp 40. The particular shape of the clamp 40 is not important of course in so far as the instant invention is concerned.

The particular clamp here shown by way of illustration comprises an L-shaped bracket 42 arranged so that one arm 44 thereof extends under the block 30. A stud 46 threaded into the plate 10 extends downwardly through an opening 48 in the bracket arm 44 and the portion of the stud which extends below the arm carries a nut 50. When the nut 50 is tightened, bracket 42 is pulled upwardly solidly against the block 30. Only one clamp 40 is shown, but it will be appreciated that several clamps may be provided around the block 30 as required to hold the block securely attached to the plate 10.

It will be observed that the depending portion 22 of the body 18 conforms more or less exactly to the cavity 32 and that the body substantially entirely fills the cavity when the block 30 is attached to the plate 10 in the manner described. A plug 52 embedded in the body 18 and extending flush with the bottom surface of the portion 22 covers the hole 38 when the body is inserted in cavity 32 as shown in the drawing.

In order to expand or distend the body 18 into cavity 32, a plunger 54 is reciprocably supported centrally of the embossment 14. The pointed lower end 56 of the plunger 54 extends into the cavity 16 and penetrates the body 18. In order to prevent air from being pumped into the cavity thus formed in body 18, a packing 58 is provided around the plunger above the embossment 14 and the packing is held in place by packing nut 60 threaded on the embossment.

Any suitable means may be provided for reciprocably actuating the plunger 54, and it is contemplated that the actuating means be either mechanically or hydraulically operated. For purpose of illustration, the plunger 54 is shown attached to a fluid motor 62 which is supported on the plate 10 by a mounting bracket 64. Motor 62 may be operated either hydraulically or pneumatically according to conventional practice, and the motor is operative to force the plunger 54 downwardly into the body 18 or to raise the plunger from the body.

The extent to which plunger 54 penetrates the body 18 is indicated visibly by a pointer 66 which is attached to and moves with the plunger. Pointer 66 coacts with a scale 68 which is attached by screws 70 to a vertical support 72 mounted on the plate 10. Screws 70 extend through vertical elongated slots 74 in the scale 68 so that the latter is vertically adjustable on the standard 72.

In operation, the gauge is initially adjusted using a master block 30 having a cavity 32 of predetermined volume or capacity. The master block is attached to the plate 10 by clamps 40 and the fluid motor 62 is operated to drive plunger 54 downwardly into the body. This action causes the plunger 54 to penetrate the elastic material of body 18. As the plunger 54 moves downwardly, it creates pressure internally in the body 18 and causes the latter to distend into cavity 32. When under load, rubber and equivalent materials act like an incompressible fluid and flows from regions of high pressure to regions of low pressure. Thus, downward movement of the plunger 54 distends the depending portion 22 of the body 18 until it intimately contacts the entire wall of the cavity 32. Inasmuch as deformation of the elastomeric material takes place with the total volume remaining constant, plunger 54 ceases to move downwardly when the body 18 is distended to the full capacity of cavity 32. Scale 68 is then adjusted on standard 72 until pointer 66 is at the zero position. The gauge is then set for checking production blocks similar to the master block.

Each production block is clamped to the plate 10 exactly as the master block with the depending portion 22 of the gauging body 18 in the cavity 32. Fluid motor 62 is then operated to drive plunger 54 downwardly into the body 18 so that the latter is expanded to the full size of the cavity and the penetration of the plunger is indicated on the scale 68. If the cavity in the production block is slightly smaller than the cavity in the master mold, pointer 66 will remain above the zero position indicating this fact. On the other hand, if the cavity in the production block is larger than the master cavity, the plunger 54 will have to penetrate body 18 further in order to completely fill the cavity and this fact will be indicated by pointer 66 moving below the zero position of the scale 68. Manifestly, the degree to which the production cavity is larger or smaller than the master cavity will be indicated with considerable accuracy by the distance pointer 66 is above or below the zero position.

In some instance, special jigs and fixtures may have to be provided for clamping the particular object being tested to the gauge or vice versa, but it will be readily apparent that once the apparatus is properly set up the production devices can be checked with great speed and accuracy. The elastomeric body 18 has an exceedingly long life and there are no parts that will quickly become worn or that can be easily broken or ruptured to render the device inoperative. The simplicity of the construction is a feature of the invention and the few parts involved make for operating stability.

Having thus described the invention, I claim:

1. A checking gauge for measuring the volume of an open cavity in the surface of an object comprising a cover adapted to engage said object around said cavity and when so engaged to entirely enclose the cavity, a body of elastomeric material adapted for placement in said cavity before the latter is enclosed by said cover, said body having generally the same form as the cavity to be measured and adapted to be confined therein by said cover, a reciprocable plunger having a tapered end portion disposed to penetrate said body, an actuator connected to the plunger adapted to drive the latter into the body so as to place the body under pressure and to distend it into intimate engagement with the enclosing walls of the cavity, and an indicator for measuring and registering the extent to which the body is distended.

2. The combination as set forth in claim 1 wherein said indicator comprises a stationary scale and a pointer on the plunger movable therewith and along said scale to register the penetration of the plunger into the body.

3. The combination as set forth in claim 1 wherein said body is carried by the cover and insertible automatically into said cavity as the cover is brought into engagement with said object.

4. The combination as set forth in claim 1 wherein said cavity has at least one additional opening therein and said body has a plug embedded therein and located to cover said opening when the body is placed in the cavity.

5. The combination as set forth in claim 1 wherein said cover has a central embossment and said plunger is slidably supported by the embossment.

RUSSELL M. ROBERTS.

References Cited in the file of this patent

UNITED STATES PATENTS

| Number | Name | Date |
|---|---|---|
| 2,270,505 | Burleson | Jan. 20, 1942 |
| 2,508,496 | Conzelman | May 23, 1950 |

FOREIGN PATENTS

| Number | Country | Date |
|---|---|---|
| 231,080 | England | Mar. 26, 1925 |